(12) United States Patent
Bedard

(10) Patent No.: US 7,048,293 B2
(45) Date of Patent: May 23, 2006

(54) SNOW REMOVAL FLAP

(75) Inventor: Yvon Bedard, Orford (CA)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

(21) Appl. No.: 10/920,222

(22) Filed: Aug. 18, 2004

(65) Prior Publication Data
US 2005/0039962 A1 Feb. 24, 2005

Related U.S. Application Data

(60) Provisional application No. 60/496,912, filed on Aug. 22, 2003.

(51) Int. Cl.
*B62J 25/00* (2006.01)

(52) U.S. Cl. .................. 280/291; 180/182; 180/190; 74/564; 296/75

(58) Field of Classification Search ........ 180/182–185, 180/190; 74/564; D12/114; 296/75; 280/291, 280/288.4, 304.4
See application file for complete search history.

(56) References Cited

U.S. PATENT DOCUMENTS

| | | | | |
|---|---|---|---|---|
| 6,016,943 A | * | 1/2000 | Johnson et al. | 224/401 |
| 6,224,134 B1 | * | 5/2001 | Johnson et al. | 296/75 |
| 6,270,106 B1 | * | 8/2001 | Maki et al. | 280/291 |
| 6,446,744 B1 | * | 9/2002 | Wubbolts et al. | 180/190 |
| 6,604,594 B1 | * | 8/2003 | Wubbolts et al. | 180/186 |

FOREIGN PATENT DOCUMENTS

CA 1141802 * 2/1983

* cited by examiner

*Primary Examiner*—Lesley D. Morris
*Assistant Examiner*—Matthew Luby
(74) *Attorney, Agent, or Firm*—Osler, Hoskin & Harcourt LLP

(57) ABSTRACT

A footrest for a snowmobile comprises relatively large openings and a cover plate attached therebeneath to form a snow discharging passage in communication with the openings permitting snow on the footrests to be forced down therethrough and prohibiting snow from traveling upwardly therethrough and onto the footrest as a result of snowmobile motion. The footrests of the present invention allow the snow and ice to be effectively discharged while the driver is riding the snowmobile, and thereby eliminates the need to stop the snowmobile to remove the snow and ice on the footrests using hands or other tools.

12 Claims, 6 Drawing Sheets

SNOW REMOVAL FLAP

This application claims the benefit of priority to U.S. Provisional Application 60/496,912 filed on Aug. 22, 2003, the contents of which are incorporated herein by reference.

FIELD OF THE INVENTION

The present invention relates to a snowmobile, and more particularly to a snowmobile footrest structure.

BACKGROUND OF THE INVENTION

Snowmobiles usually include a pair of footrests disposed at opposite sides of the snowmobile to provide a comfortable ride when a driver sits on a straddle seat thereof. Each of the footrests generally includes a standing surface for firm contact with the driver's feet in order to ensure the driver's stable riding position, even while the snowmobile travels over uneven terrain at a high speed.

Examples of snowmobile footrests are disclosed in U.S. Pat. No. 4,779,695, issued to Yasui on Oct. 25, 1988; U.S. Pat. No. 5,518,080, issued to Pertile on May 21, 1996; and U.S. Pat. No. 6,604,594, issued to Wubbolts et al. on Aug. 12, 2003.

When a snowmobile travels at a high speed on snow, snow is constantly being thrown upwardly and rearwardly relative to the travel direction of the snowmobile and onto the footrests where the driver's feet are positioned. Under certain conditions, such as powder snow in the mountains, the footrests can become packed with snow, which prevents the driver's feet from contacting the standing surfaces of the footrests, and makes the footrests very slippery. Therefore, the snowmobile driver is inclined to consistently kick at the snow covering the standing surfaces of the footrests, attempting to loosen the snow and push it off the standing surfaces of the footrests. Furthermore, after the footrests become covered with snow, the driver is compelled to search for the footholds in order to stabilize himself or herself to the snowmobile, and thereby pushes the snow into the forward portion of the footrests, and therefore the snow accumulated on the standing surfaces of the footrests tends to become packed against the front stop of each footrest where it becomes hard to remove during the riding of the snowmobile. Thus, a driver is forced to stop and use his or her hands or other tools to clean away the snow from the footrests.

In order to provide secure footholds on the footrests, tooth-shaped foot grips are conventionally formed as a part of the footrests. The foot grips sometimes have small holes passing through the footrest. However, these holes do not let enough snow pass through and thus become blocked by the snow very quickly. Therefore, the foot grips are also packed by the snow. Larger holes are not a viable solution because they would allow snow to travel up therethrough to be deposited on the standing surfaces of the footrests, thereby worsening the problem.

Therefore, there is a need for an improved snowmobile footrest configuration in order to prevent snow from accumulating thereon.

SUMMARY OF THE INVENTION

One object of the present invention is to provide a simple and inexpensive snowmobile footrest, which prevents snow from accumulating thereon.

The present invention in accordance with one aspect thereof is generally directed to a footrest for a snowmobile, which comprises a standing surface attached to the snowmobile for receiving a rider's foot resting thereon. The standing surface includes a snow discharging passage permitting snow on the standing surface to be forced downward therethrough, and prohibiting snow from traveling upward therethrough and onto the standing surface as a result of snowmobile motion.

The footrest of the present invention preferably comprises at least one opening through the standing surface and a cover plate attached to an under surface of the footrest. The cover plate in combination with the undersurface of the footrest preferably forms the discharging passage, which is closed, at a front end of the cover plate. The discharging passage is preferably in communication with the opening and extends downwardly and rearwardly to discharge snow from the standing surface therethrough, while the cover plate prevents snow that is traveling rearwardly and upwardly relative to the snowmobile, from entering the discharging passage and the opening.

In one embodiment of the present invention, the cover plate is flexible and resilient. The flexible and resilient cover plate is attached at the front end thereof to the under surface of the footrest and is normally disposed in a position to form the discharging passage which is relatively smaller than the discharging passage when same is being expanded by snow under force passing downwards therethrough.

In another embodiment of the present invention, the cover plate is rigid and pivotally attached at the front end thereof to the undersurface of the footrest. The rigid cover plate is normally biased by a spring element, into a position to form the discharging passage which is relatively smaller than the discharging passage when same is being expanded by snow under force passing downwards therethrough and thereby causing the rigid cover plate to pivot against the spring element.

The footrest of the present invention will permit the snow and perhaps ice on the standing surface of the footrest to be constantly pushed out through the opening or openings by the driver's foot while driving because this is where the driver's foot will be placed most of the time. Because the front portion of the front end of the cover plate is connected to the undersurface of the footrest, the cover plate prevents snow from entering through the opening or openings and thereby accumulating on the standing surface of the footrest while the snowmobile is passing through the snow. The cover plate permits the snow and ice on the standing surface to be pushed out through the opening or openings while the driver is riding and thus avoids the need to stop and remove the snow and ice on the standing surface using the driver's hands or other tools.

Other features and advantages of the present invention will be better understood with reference to the preferred embodiments described hereinafter.

BRIEF DESCRIPTION OF THE DRAWINGS

Having thus generally described the nature of the present invention, reference will now be made to the accompanying drawings, showing by way of illustration the preferred embodiments thereof, in which.

DETAILED DESCRIPTION OF THE PREFERRED EMBODIMENT

Figure 1:
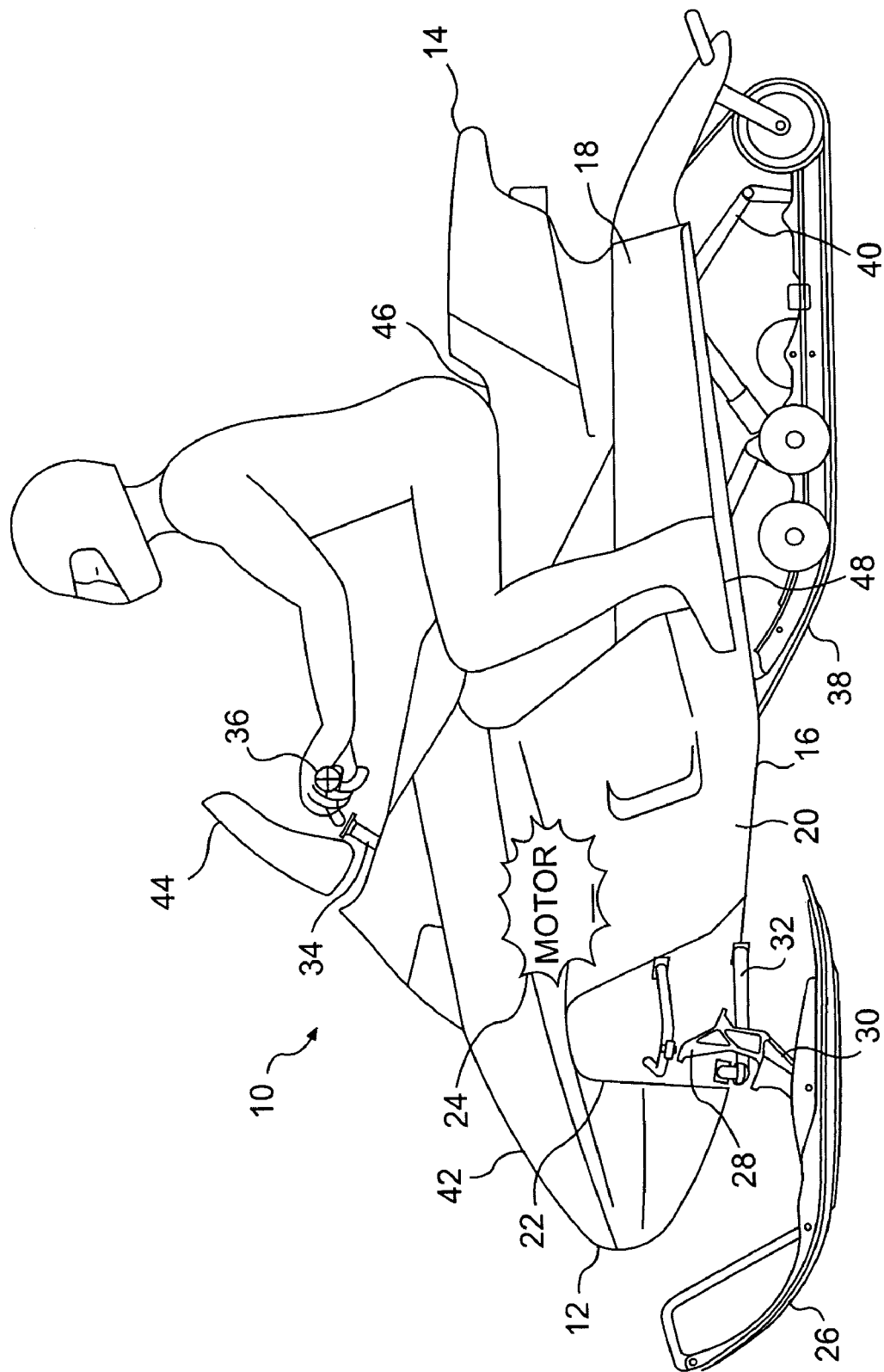
FIG. 1 is a schematic side view of a snowmobile incorporating one embodiment of the present invention.

Referring now in detail to the drawings, and primarily to FIG. 1, a snowmobile incorporating the present invention is identified generally by the reference numeral 10. The snowmobile 10 includes a forward end 12 and rearward end 14, which are defined consistently with the travel direction of the vehicle. The snowmobile 10 further includes a chassis 16, which normally includes a rear tunnel 18, an engine cradle portion 20 and a front suspension assembly portion 22. An engine 24, which is schematically illustrated, is carried by the engine cradle portion 20 of the chassis 16.

A ski and steering assembly (not indicated) is provided, in which two skis 26 (only one is shown) are positioned at the forward end 12 of the snowmobile 10 and are attached to the front suspension assembly portion 22 of the chassis 16 through a front suspension assembly 28. The front suspension assembly 28 includes ski legs 30, supporting arms 32 and ball joints 33 for operatively joining the respective ski legs 30, supporting arms 32 and a steering column 34. The steering column 34 at its upper end is attached to a steering device such as a handle bar 36 which is positioned forward of a driver and behind the engine 24 to rotate the ski legs 30 and thus the skis 26, in order to steer the vehicle.

An endless drive track 38 is positioned at the rearward end 14 of the snowmobile 10 and is disposed on a tunnel 18, being connected operatively to the engine 24 through a belt transmission system (not shown). Thus, the endless drive track 38 is driven to run about a rear suspension assembly 40 which is conventionally configured with a slider frame structure with rollers, arms and shock absorbers (all not indicated).

At the front end 12 of the snowmobile 10, there are provided fairings 42 that not only protect the engine 24 and the belt transmission system, but can also be decorated to make the snowmobile 10 more aesthetically pleasing. Typically, the fairings 42 include a hood 43 and one or more side panels 45, which are both operable to allow for access to the engine 24 and the belt transmission system when this is required. A windshield 44 may be connected to the fairings 42 near the front end 12 of the snowmobile 10 or may be attached directly to the handle bar 36. The windshield 44 acts as a windscreen to lessen the force of air on the driver while the snowmobile 10 is moving.

A seat 46 extends from the rear end 14 of the snowmobile 10 to the fairings 42. A rear portion of the seat 46 may include a storage compartment, or may be used to accept a passenger seat (not indicated). Two footrests 48 (only one shown) are positioned on opposed sides of the snowmobile 10 below the seat 46 to accommodate the driver's feet.

Figure 2:
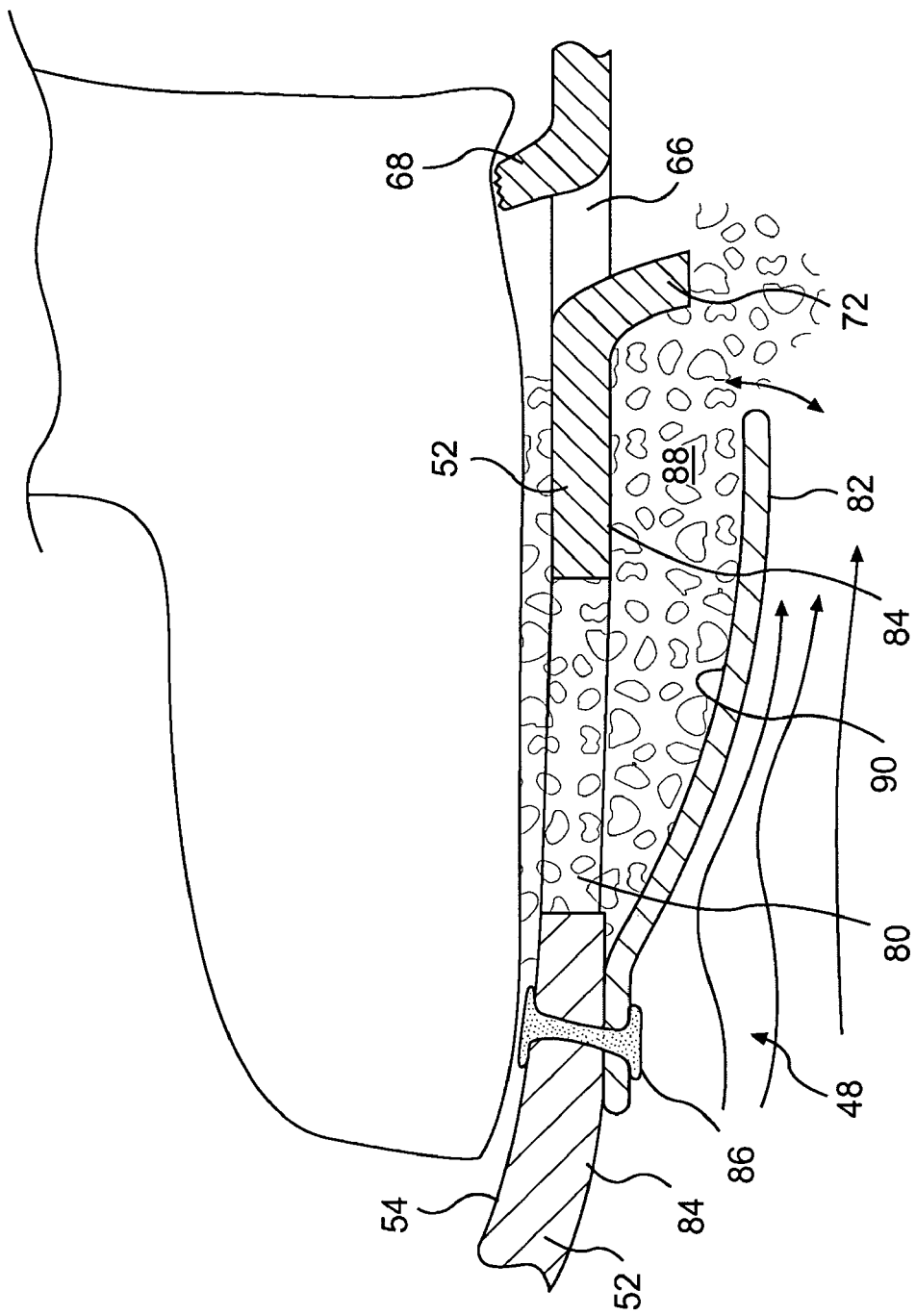
FIG. 2 is a partial schematic cross-sectional view of a footrest according to the embodiment of FIG. 1.
Figure 3:
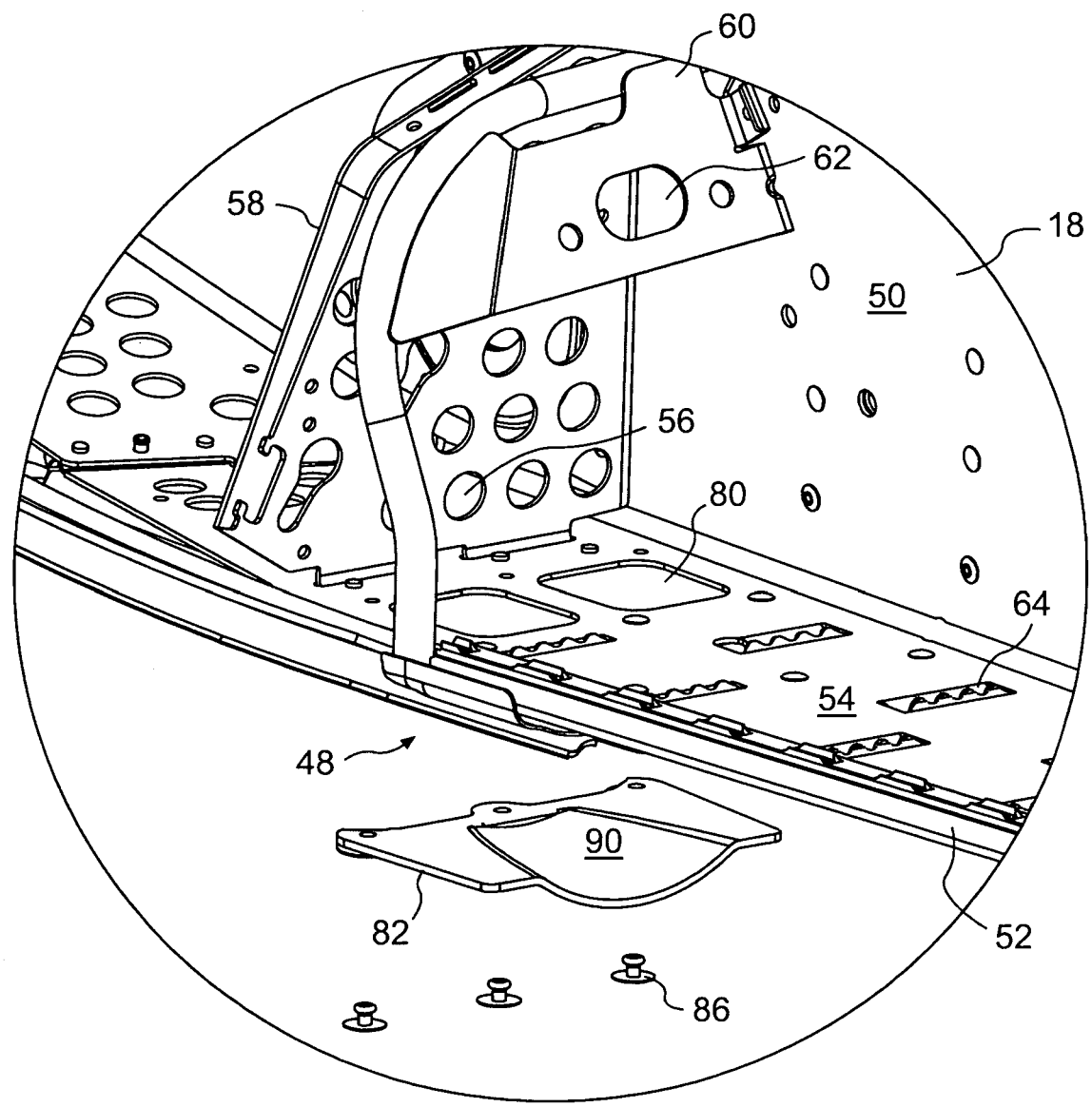
FIG. 3 is a partial side and rear perspective view of the footrest according to the embodiment of FIG. 1.
Figure 4:
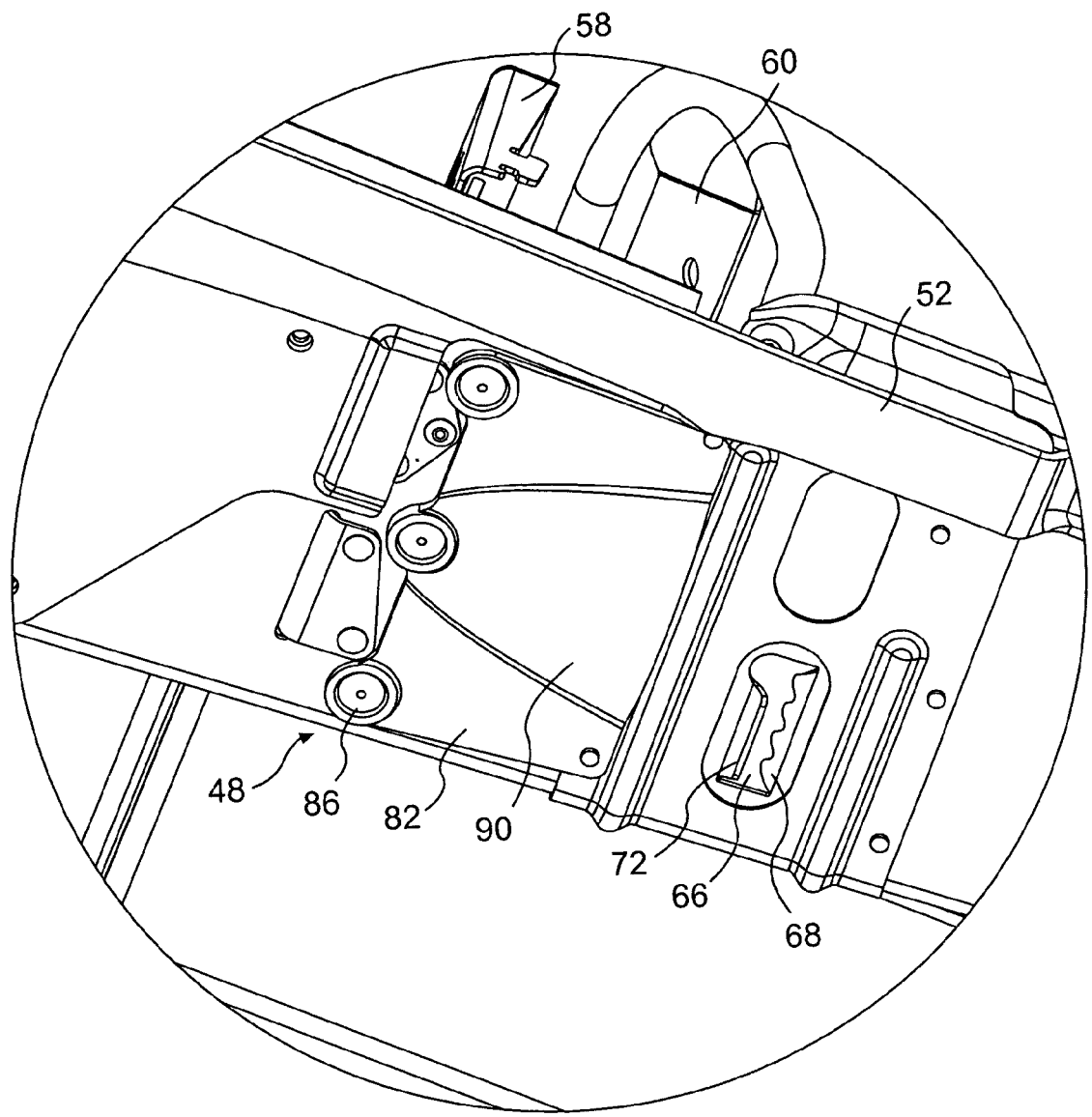
FIG. 4 is a partial bottom perspective view of the footrest according to the embodiment of FIG. 1.

Referring now to FIGS. 2–4, the footrests 48 are attached to the opposed vertical side walls 50 of the tunnel 18. The right and left footrests 48 are identical and so only the left footrest 48 is illustrated and described. The footrest 48 is configured with a metal plate 52, which extends laterally and outwardly from the bottom end of a vertical side wall 50 of the tunnel 18, and is preferably integrated therewith. The metal plate 52 has an upper surface functioning as a standing surface 54 of the footrest 48 on which the driver's left foot rests. A foot stop 58 is provided at the front portion of the plate 52. The foot stop 58 is configured as a substantially vertical metal plate with a plurality of openings 56, and is affixed to both the plate 52 and the vertical side wall 50 of the tunnel 18 by, for example, fasteners. The foot stop 58 prevents the driver's foot from moving forward away from the footrest 48 and thereby ensures a secure foothold on the footrest 48 when the snowmobile 10 travels over uneven terrain at a high speed.

A toe holder 60 is disposed rearward of the foot stop 58 and is affixed to the vertical side wall 50 of the tunnel 18, for example, by fasteners. The toe holder is also configured as a metal plate with openings 62 and is positioned above the metal plate 52 such that the space between the lower end of the toe holder 60 and the standing surface 54 accommodates a toe portion of a driver's boot, in order to further ensure a secure foothold during riding of the snowmobile 10.

Figure 5:
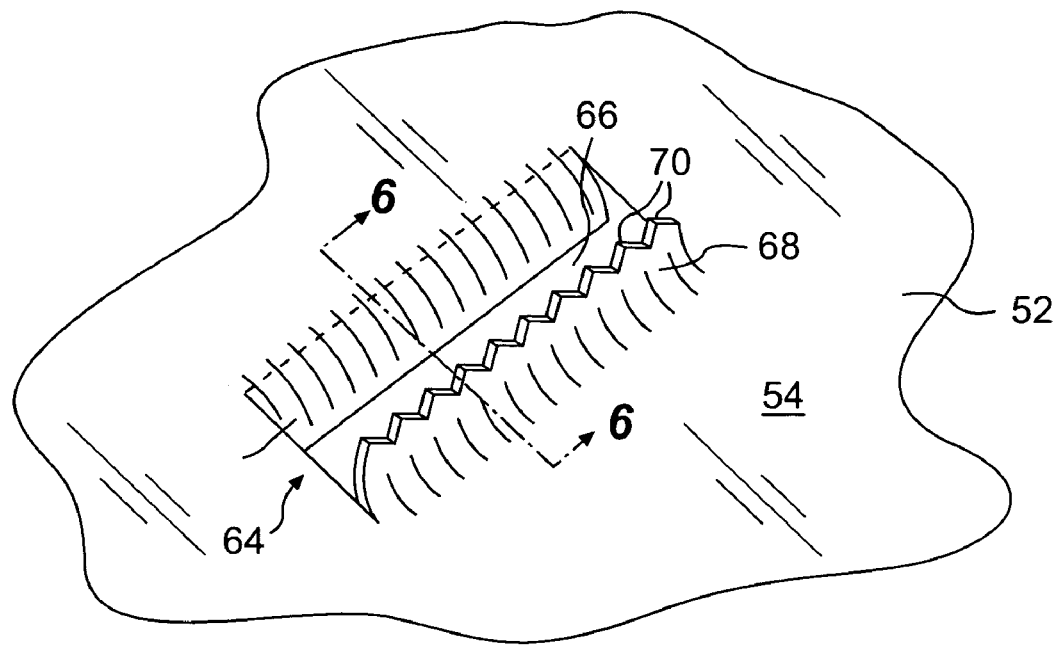
FIG. 5 is an enlarged perspective view of a foot-gripping element used in the embodiment of FIG. 1.
Figure 6:
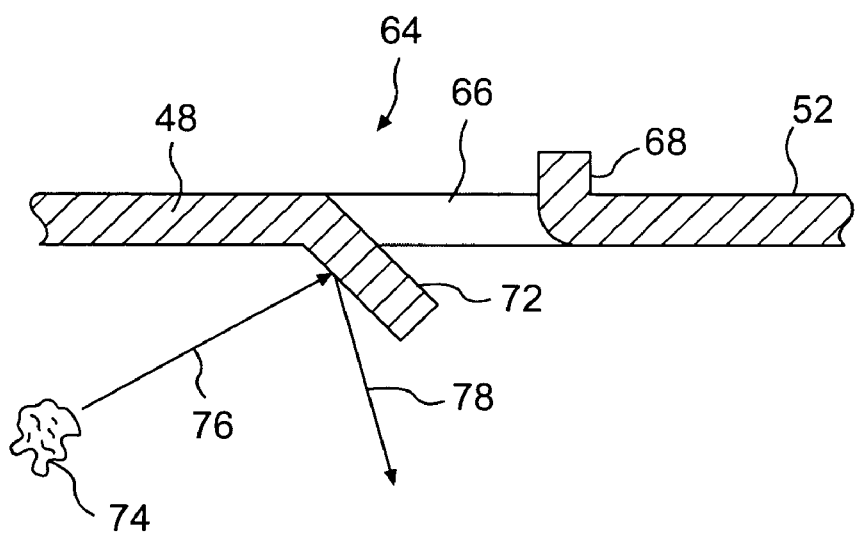
FIG. 6 is a cross-sectional view taken along line 6—6 in FIG. 5, of the foot-gripping element.

The footrest 48 is provided with a number of foot-gripping elements 64, which is disclosed in U.S. Pat. No. 6,604,594 and is briefly described herein. One of the foot-gripping elements 64 is illustrated in enlarged detail in FIGS. 5 and 6. Foot-gripping element 64 is constructed as part of a hole 66 through the metal plate 52. On one side of the hole 66, the foot-gripping element 64 is configured as a jagged element 68 with teeth 70 curving upwardly from the standing surface 54. On the other side of the hole 66, the foot-gripping element 64 is configured as a deflector element 72 curving downwardly from the under surface of the metal plate 52.

Foot-gripping elements 64 provide traction for the driver's boot because the foot-gripping elements 64 extend upwardly from the standing surface 54 of the footrest 48. The top of each jagged element 68 includes teeth 70 that provide increased traction for the driver's boot. Deflector element 72 of the other side of the hole 66 preferably deflects snow or dirt particles 74 that may be stirred up by the movement of the vehicle over the ground. If a dirt particle 74 moves toward the bottom of the footrest 48 in the direction shown by arrow 76, deflector element 72 will deflect particle 74 so that it then travels in the direction shown by arrow 78, which is away from hole 66. As a result, dirt particles 74 are discouraged from passing through hole 66 and accumulating on the standing surface 54 of the footrest 48.

In order to discharge the snow accumulated on the standing surface 52 of the footrest 48, a pair of large openings or discharge passages 80, as shown in FIGS. 2 and 3, are defined in the plate 52, which are preferably square according to this embodiment, but could be of any other shape. In contrast to the holes 66, the openings 80 are relatively large such that it is easy to force the snow that is to be discharged through the openings 80 without blocking same. The number of openings 80 may be changed, for example, to 1 or 3, provided that each of the openings 80 is large enough to discharge the snow without being blocked, but also does not adversely affect the strength and rigidity of the footrests 48. The openings 80 are disposed between the foot stop 58 and the plurality of foot-gripping elements 64, preferably at an axial position under the toe holder 60.

A cover plate 82 is attached, preferably at its front portion to an under surface 84 of the plate 52 by, for example, a plurality of fasteners 86. However, the cover plate can be otherwise attached, for example, to the standing surface 54 of the footrest 48. In such a case the cover plate would have to pass the openings 80. Thus, the cover plate 82 is normally disposed in a position (not shown but similar to that shown in FIG. 7 of another embodiment) to substantially close the openings 80. The cover plate 82 in accordance with one embodiment of the present invention, is made of a flexible and resilient material such as plastic or rubber such that the rear and middle portions of the cover plate 82 are displaced downwardly to form in combination with the under surface 84 of the plate 52, a snow discharging passage 88 therebetween when the snow accumulated on the standing surface 54 or the plate 52 is stepped on by the driver's foot and is thereby forced into the openings 80 to then press the flexible and resilient cover plate downwardly. Thus, the snow under the driver's continuous stepping force, is forced to move downwardly and rearwardly to pass through the openings 80 and the snow discharging passage 88, and to then fall to the ground. The flexible and resilient cover plate 82 not only in its normal closed position, but also in its displaced position for discharging snow, effectively acts as a one-way valve, and prohibits snow on the ground from traveling upwardly through the openings 80 and onto the standing surface 54 of the plate 52 as a result of snowmobile motion. This results from the snow discharging passage 88 formed between the rear portion of the cover plate 82 and the under surface 84 of the plate 52, having an outlet for discharging snow located rearward of the openings 80. Thus, the snow from the ground would have to travel upwardly and forwardly relative to the snowmobile 10 in order to enter the discharging passages 88 onto the standing surface 54 of the plate 52. This will not happen when the snow movement is caused by the snowmobile 10 during a forward motion thereof.

In accordance with another embodiment of the present invention, best shown in FIG. 3, the flexible and resilient cover plate 82 has a middle portion permanently deformed to project downwardly, thereby forming a downward recess 90 extending rearwardly through the rear end of the cover plate 82.

With such a rearwardly opened recess 90, the cover plate 82 does not completely close the openings 80 when being in its normal position as shown in FIG. 2, but forms the snow discharging passage 88 between the recessed portion 90 and the under surface 84 of the plate 52. Nevertheless, the snow discharging passage 88 formed therebetween when the flexible and resilient cover plate 82 is in its normal position is relatively smaller with respect to the expanded snow discharging passage 88 when the flexible and resilient cover plate 82 is downwardly displaced under the force of the stamped snow. The expanded snow discharging passage 88 makes the snow discharge easier. The expanded snow discharging passage 88 are still formed between the rear portion of the cover plate 82 and a portion of the under surface 84 of the plate 52 rearwards of the openings 80, and therefore does not change the feature of preventing snow from traveling up through the openings 80 onto the standing surface 54 of the plate 52.

Figure 7:
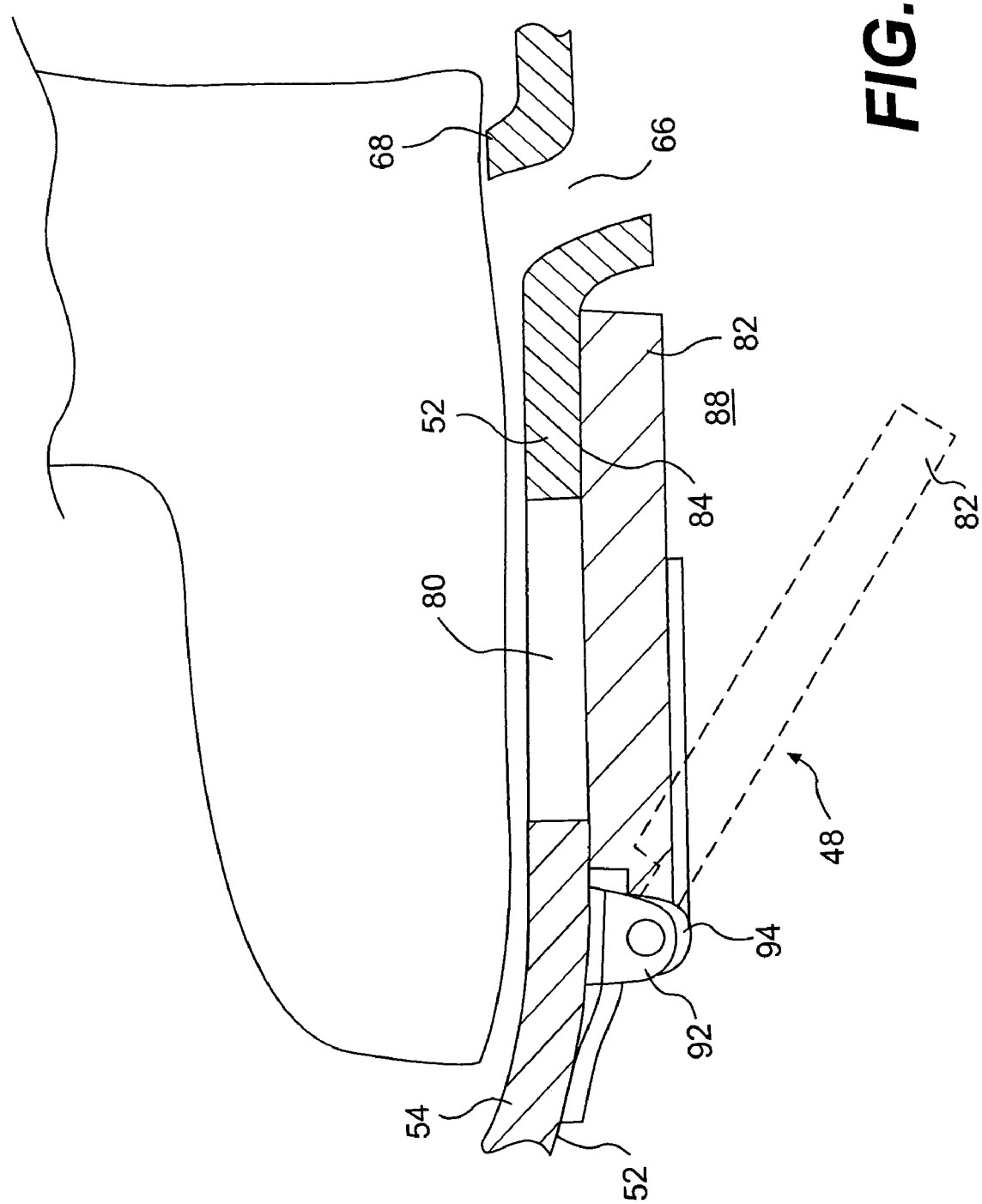
FIG. 7 is a partial schematic cross-sectional view of a footrest according to another embodiment of the present invention.

Referring to FIG. 7, in accordance with a further embodiment of the present invention, the cover plate 82 is made of a rigid material, such as a metal plate, either being flat or with the rearwardly opened recess. The rigid cover plate 82 is attached at its front end to the under surface 84 of the plate 52 at a position forward of the openings 80, by pivoting device 92. The rigid cover plate 82 illustrated in FIG. 7 is in a relatively flat configuration and is normally biased by a torsion spring 94 into a position which substantially closes the openings 80. When the snow accumulated on the standing surface 54 of the plate 52 is pressed by the driver's boot and forced into the openings 80, the rigid cover plate 82 is pushed to pivot against the torsion spring 94 to form the snow discharging passage 88 between the rear portion of the cover plate 82 and the under surface 84 of the plate 52, at a position rearward of the openings 80. Similar to the embodiments described above, the snow discharging passage 88 permits the snow to be forced downwardly therethrough and to be discharged onto the ground, while prohibiting snow from traveling up therethough and onto the standing surface 54.

A pivotable rigid cover plate with the rearwardly opened recess functions similarly to the flexible and resilient cover plate 82 with rearwardly opened recess as described above with reference to FIGS. 2–4.

The above described embodiments of the present invention are examples and do not limit any alternative embodiments of the present invention. For example, although it is preferable that the cover plate attached to the under surface of the footrest is deformable or pivotable to facilitate the snow discharge, the cover plate can be non-deformable and affixed to the under surface of the footrest when a snow discharging passage is formed between the cover plate and the under surface of the footrest rearward of the openings such that the snow discharging passage is closed at a front end, and is in communication with the openings in the standing surface, thereby permitting snow on the standing surface to be forced down therethrough and prohibiting snow from traveling upward therethrough onto the standing surface as a result of snowmobile motion. As shown in FIG. 1, the footrests 48 may extend rearwardly to the rear end of the tunnel 18 and more openings 80 with the cover plate 82 can be provided at a rear portion of the footrest 48 for discharging snow forced out by a passenger's feet. Thus, the footrest 48 of the present invention can be used for both snowmobile drivers and passengers.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

I claim:

1. A snowmobile comprising:
   a chassis including a tunnel;
   an engine disposed on the chassis;
   a drive track disposed below and supported by the tunnel and operatively connected to the engine for propulsion of the snowmobile;
   two skis disposed on the chassis, each via a front suspension;
   a straddle seat disposed on the tunnel above the drive track and rearward of the engine; and
   a footrest attached to the tunnel for receiving a rider's foot thereon, the footrest including an opening passing therethrough and a movable one-way valve associated with the opening in order to permit snow to pass through the opening in a downward direction.

2. The snowmobile as claimed in claim 1, wherein the valve includes a cover plate attached to an under surface of the footrest, the coverplate having an opened configuration and a closed configuration and when in the opened configuration the cover plate, in combination with the under surface of the footrest and the opening, form a discharge passage, the discharge passage extending downwardly and rearwardly to discharge snow from the footrest, the cover plate preventing snow travelling rearwardly and upwardly relative to the snowmobile from entering the opening.

3. The snowmobile as claimed in claim 2, wherein the cover plate is flexible, resilient, and attached at the front portion thereof to the under surface of the footrest such than when in the closed configuration the cover plate generally closes the opening and expands to form the discharge passage in response to snow passing through the opening.

4. The snowmobile as claimed in claim 2, wherein the cover plate is rigid and pivotally attached at a front end thereof to the under surface of the footrest in the closed configuration such that the cover plate generally closes the opening, the cover plate pivoting away from the under surface of the footrest in response to snow passing through the opening to form the discharge passage.

5. The snowmobile as claimed in claim 2, wherein the cover plate comprises a downward recess extending rearwardly through a rear end of the cover plate.

6. The snowmobile as claimed in claim 2, wherein the footrest further comprises two openings through the footrest, the cover plate preventing snow travelling rearwardly and upwardly relative to the snowmobile from entering the openings.

7. The snowmobile as claimed in claim 6, wherein the footrest further comprises foot grip elements disposed on the upper surface thereof.

8. The snowmobile as claimed in claim 7, wherein the footrest further comprising a foot stop disposed at a front end thereof, and the openings are located forwardly of the foot grip elements and rearwardly of the foot stop.

9. The snowmobile as claimed in claim 1, wherein the valve is a flexible and resilient member and is attached at the front portion thereof to the under surface of the footrest, and is normally disposed in a position to substantially close the opening and is adapted to open the opening when being pressed downwardly by snow under force.

10. The snowmobile as claimed in claim 2, wherein the valve is a rigid member pivotally attached at a front end thereof to the under surface of the footrest, the rigid member being normally biased by a resilient element into a position to substantially close the opening and being adapted to pivot downwardly to open the opening when being pressed upon by snow under force.

11. The snowmobile as claimed in claim 1, wherein the footrest further comprises foot grip elements disposed on the upper surface thereof.

12. The snowmobile as claimed in claim 11, wherein the footrest further comprising a foot stop disposed at a front end thereof, and the openings are located forwardly of the foot grip elements and rearwardly of the foot stop.

* * * * *